United States Patent
Karlsen et al.

(10) Patent No.: US 9,641,581 B2
(45) Date of Patent: May 2, 2017

(54) CONTROLLING STREAMING OF DATA FROM A STREAMING SERVER TO A USER EQUIPMENT VIA A RADIO ACCESS NETWORK

(71) Applicant: Telefonaktiebolaget L M Ericsson (publ), Stockholm (SE)

(72) Inventors: Johnny Karlsen, Järfälla (SE); Per Willars, Vaxholm (SE); Thorsten Lohmar, Aachen (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 171 days.

(21) Appl. No.: 14/403,778

(22) PCT Filed: May 27, 2013

(86) PCT No.: PCT/SE2013/050601
§ 371 (c)(1),
(2) Date: Nov. 25, 2014

(87) PCT Pub. No.: WO2013/180629
PCT Pub. Date: Dec. 5, 2013

(65) Prior Publication Data
US 2015/0124701 A1 May 7, 2015

Related U.S. Application Data

(60) Provisional application No. 61/654,233, filed on Jun. 1, 2012.

(51) Int. Cl.
*H04L 29/06* (2006.01)
*H04N 21/222* (2011.01)
(Continued)

(52) U.S. Cl.
CPC ......... *H04L 65/60* (2013.01); *H04N 21/2223* (2013.01); *H04N 21/238* (2013.01);
(Continued)

(58) Field of Classification Search
None
See application file for complete search history.

(56) References Cited

FOREIGN PATENT DOCUMENTS

| WO | WO/2005/022892 | * | 3/2005 | ............... H04N 7/16 |
|----|----|----|----|----|
| WO | WO 2005/022892 A2 | | 3/2005 | |
| WO | WO 2012/019272 A1 | | 2/2012 | |

OTHER PUBLICATIONS

Hoque et al: "On the Energy Efficiency of Proxy-Based Traffic Shaping for Mobile Audio Streaming," The 8$^{th}$ Annual IEEE Consumer Communications and Networking Conference—Multimedia & Entertainment Networking and Services, Jan. 9-12, 2011, Las Vegas, NV; pp. 891-895.

(Continued)

*Primary Examiner* — Chi H Pham
*Assistant Examiner* — Raul Rivas
(74) *Attorney, Agent, or Firm* — Sage Patent Group

(57) ABSTRACT

A method of controlling streaming of data, such as video, from a streaming server to a User Equipment (UE) via a Radio Access Network (RAN) is provided. The method includes receiving streaming data from the streaming server, re-shaping the received streaming data into bursts, and transmitting the bursts to the UE. The bursts are transmitted at a higher bitrate than the bitrate of the received streaming data. By re-shaping the streaming data into bursts, streaming can be effected in a more radio-friendly way, since the UE may switch to a less resource consuming radio state in-between reception of data bursts delivered at high bitrates. Further, a corresponding computer program and computer program product, and a proxy unit for controlling streaming of data from a streaming server to a UE via a RAN, are provided.

13 Claims, 4 Drawing Sheets

(51) Int. Cl.
H04N 21/2365 (2011.01)
H04N 21/238 (2011.01)
H04N 21/61 (2011.01)
H04W 52/02 (2009.01)

(52) U.S. Cl.
CPC ..... *H04N 21/2365* (2013.01); *H04N 21/6131* (2013.01); *H04W 52/0212* (2013.01); *H04W 52/0206* (2013.01); *Y02B 60/50* (2013.01)

(56) References Cited

OTHER PUBLICATIONS

International Search Report, PCT Application No. PCT/SE2013/050601, Oct. 9, 2013.
Written Opinion of the International Searching Authority, PCT Application No. PCT/SE2013/050601, Oct. 9, 2013.
International Preliminary Report on Patentability, PCT Application No. PCT/SE2013/050601, Jul. 23, 2014.
Chandra et al., "Application-specific network management for energy-aware streaming of popular multimedia formats", *Proceedings of the 2001 USENIX Annual Technical Conference,* Monterey, California, Jun. 10-15, 2002, 15 pp.
ETSI, European Standard (Telecommunications series), Digital Video Broadcasting (DVB); Transmission System for Handheld Terminals (DVB-H), EN 302 304, V1.1.1 (Nov. 2004), 14 pp.
Sumankumar et al., "Power Management in IEEE 802.11 WLAN using Proxy-Assisted WLAN Controller", *IEEE Fourth International Conference on Communication Systems and Networks (COMSNETS),* Jan. 3, 2012, 6 pp.

\* cited by examiner

US 9,641,581 B2

CONTROLLING STREAMING OF DATA FROM A STREAMING SERVER TO A USER EQUIPMENT VIA A RADIO ACCESS NETWORK

CROSS REFERENCE TO RELATED APPLICATIONS

This application is a 35 U.S.C. §371 national stage application of PCT International Application No. PCT/SE2013/050601, filed on 27 May 2013, which itself claims priority to U.S. provisional Application No. 61/654,233, filed 1 Jun. 2012, the disclosures and contents of both of which are incorporated by reference herein in their entirety. The above-referenced PCT International Application was published in the English language as International Publication No. WO 2013/180629 A1 on 5 Dec. 2013.

TECHNICAL FIELD

The invention relates to a method of controlling streaming of data from a streaming server to a User Equipment (UE) via a Radio Access Network (RAN), a corresponding computer program and computer program product, and a proxy unit for controlling streaming of data from a streaming server to a UE via a RAN.

BACKGROUND

Mobile broadband radio networks typically employ a state machine in the RAN and the UE to support radio states with different throughput, i.e., data bitrate. In Universal Mobile Telecommunications System (UMTS), these states are referred to as Radio Resource Control (RRC) states. A higher radio state is used to provide a high throughput channel to the UE, but staying in that state also consumes resources of the RAN, such as associated control signaling, as well as consumes battery power of the UE. Therefore, it can be more efficient to transmit a given amount of data at a high, or highest, available bitrate of a radio link between the UE and the RAN, and then switch down to a lower radio state during an idle period to conserve network resources and battery life.

Due to the delay and resource cost, such as associated control signaling, of switching radio states, switching to a lower radio state may make sense when the idle period is sufficiently long so that the resources conserved by switching to the lower radio state are sufficiently greater than the resources expended to switch to the lower radio state and then back to the higher radio state. Typically, downswitching of radio state is triggered by detecting an idle period of data traffic using an inactivity timer. Other mechanisms can however also be used.

In a 3rd Generation Partnership Project (3GPP) Wideband Code Division Multiple Access (WCDMA) network, the high radio state corresponds to Cell_DCH/HSPA. In a Long Term Evolution (LTE) network, the high radio state corresponds to the Active substate of Connected Mode.

Decisions for when and how to initiate downswitching can be based on consideration of one or more of the following properties:

Providing good end-user experience, including quick start-up for playout of a media stream to a user, minimizing re-buffering events, and/or maximizing available bitrate, Increasing battery efficiency by not staying longer than needed in a high radio state, Improving radio resource efficiency by reducing resource utilization over the duration of a data streaming session to a UE by minimizing the time spent in a high radio state, Improving data volume efficiency by avoiding downloading of data bytes that are never consumed (e.g., played) by the UE (unused data bytes are charged to the end-user's data plan and unnecessarily consume system communication resources), and Reducing signaling load by avoiding frequent switching between radio states.

It has been proposed to deliver video with big chunks of data at high speed, and then create long idle gaps allowing a downswitch of radio state.

Progressive video streaming is one known approach for streaming video from video servers. A video player, e.g., a functional module on a UE, may display an indication of the current play location within the video, and may further display an indication the present buffering state. FIG. 1 illustrates example information that is displayable on a display device of a UE while a video stream is being played, both with and without controlled pacing of the video stream. A certain amount of data must be received for the video player to continue to play the video stream, otherwise the video player "freezes" and waits until a playback buffer is sufficiently filled with more video data. The end-user experience during playback may be improved by fetching the entire video file as quickly as possible so that the playback buffer is full. However, after fetching the entire video file, the end-user may not watch the entire video or may seek forward and skip certain parts of the video, which results in non-viewed streamed video data.

FIG. 1 illustrates an example graph 102 of the bitrate ("Data rate" in FIG. 1) at which video is streamed from a streaming server to a UE for display in a display area 100 while pacing is not utilized. Streaming video that is ultimately not played to a user unnecessarily consumes network resources, which is discouraged by operators. For example, in the displayed area 100, if the user stops viewing the video after watching 25 seconds, the remaining 3 minutes and 55 seconds of buffered video, indicated by 104, would become a wasted portion of streamed video data.

One approach to improving efficiency is to pace, or throttle, a video stream so that the video player has just enough data in its playback buffer to enable the video player to continue playing without pauses (freezing). The streaming server can operate to pace the video stream from the streaming server to a video player on the UE consuming the video stream, so as to provide the streaming video at a bitrate that approximates the rate at the video data is consumed by the video player and independently of the available communication bitrate to the UE. Accordingly, although a communication pathway to the UE would support a higher bitrate, the streaming server paces the video stream at a bitrate that is regulated based on providing just enough data to enable playback of the video without pauses.

FIG. 1 further illustrates an example graph 112 of the bitrate at which video is streamed from a streaming server to a UE for display in a display area 110 while pacing is utilized. While using pacing, the video player is provided with just enough data in its playback buffer to enable the video player to continue playing without pauses (freezing). For example, the playback buffer can be filled at the playback rate so that the amount of buffered video, indicated by 114, is reduced or minimized.

A pre-requisite for the RAN to deliver the video stream with high radio efficiency to a streaming client, e.g., a video player of the UE, is for the streaming server to deliver the video stream with a bitrate that exceeds the inherent media bitrate by a factor of x. The factor x is a positive real number that is preferably larger than 1 and, more preferably substantially larger than 1. Increasing values of the factor x enables the UE to sleep in-between retrieving chunks of data from the streaming server, i.e., to switch to a less resource consuming radio state. However, the available bitrate to the UE is constrained by the radio interface. Since the video bitrate is typically smaller than the radio interface communication bitrate, the UE, or radio transceiver modem therein, can transition to a "sleep" state between times of high-speed data reception.

In some scenarios, for various reasons, the factor x is close to 1 or at least far below a value where the UE would be allowed to sleep any substantial time between consecutive fetches of the streaming video. The reason for this can be at least twofold:

Some policy shaping may be applied by the streaming server to constrain the video stream bitrate at a defined factor x, and/or Downstream transport limitations constrain the video stream to a lower bitrate.

SUMMARY

It is an object of the invention to provide an improved alternative to the above techniques and prior art.

More specifically, it is an object of the invention to provide an improved streaming of data from a streaming server to a UE via a RAN.

These and other objects of the invention are achieved by means of different aspects of the invention, as defined by the independent claims. Embodiments of the invention are characterized by the dependent claims.

According to a first aspect of the invention, a method of controlling streaming of data from a streaming server to a UE via a RAN is provided. The method comprises receiving streaming data from the streaming server, re-shaping the received streaming data into bursts, and transmitting the bursts to the UE. The bursts are transmitted at a higher bitrate than the bitrate of the received streaming data.

According to a second aspect of the invention, a computer program is provided. The computer program comprises computer program instructions. The computer program instructions are adapted, if executed on a processor, to implement the method according to the first aspect of the invention.

According to a third aspect of the invention, a computer program product is provided. The computer program product comprises a computer readable storage medium. The computer readable storage medium has the computer program according to the second aspect of the invention embodied therein.

According to a fourth aspect of the invention, a proxy unit for controlling streaming of data from a streaming server to a UE via a RAN is provided. The proxy comprises a processor and a memory. The memory comprises instructions which are executable by the processor. If executed, the proxy unit is operative to receive streaming data from the streaming server, re-shape the received streaming data into bursts, and transmit the bursts to the UE. The bursts are transmitted at a higher bitrate than the bitrate of the received streaming data.

The invention makes use of an understanding that streaming of data from a streaming server to a UE, e.g., video, can be effected in a more radio-friendly way by re-shaping the more or less continuous stream of data received from the streaming server into bursts of data, and delivering the bursts to the UE via the RAN through which the UE accesses the streaming server. The bursts are transmitted at a bitrate which is larger than the bitrate of the received streaming data. This is advantageous in that the UE may switch to a less resource consuming radio state in-between reception of data bursts delivered at high bitrates. In this way, radio resources of the RAN may be used more efficiently, and UE battery power may be saved. By re-shaping streamed data into bursts, i.e., "de-pacing" the data stream from the streaming server, at least some of effects of shaping which are imposed by the streaming server, or downstream limitations, may be mitigated, thereby providing downswitching opportunities to conserve resources of the RAN and the UE.

According to an embodiment of the invention, the bursts are transmitted at a bitrate being adjusted so as to increase utilization of an available communication bitrate provided by the RAN. This is advantageous in that air interface resources are used to as large extent as possible. In this respect, each radio link which is established between the RAN and the UE supports a communication bitrate which is characteristic of the type of radio link, and the bitrate at which bursts are transmitted is adjusted such that utilization of the provided communication bitrate is increased or maximized.

According to an embodiment of the invention, the method further comprises requesting multiple streams from the streaming server and combining the streaming data received in the multiple streams. In requesting multiple streams from the streaming server, the data byte start values of the multiple streams are offset. Using multiple streams allows accumulating threshold amounts of data more quickly, thereby reducing the startup delay and/or increasing the burstiness of the traffic transmitted via the RAN to the UE.

According to an embodiment of the invention, the streaming data which is received in the multiple streams is combined into contiguous blocks of streaming data.

According to an embodiment of the invention, the requested multiple streams have sequential ranges of data.

According to an embodiment of the invention, the method further comprises receiving an initial chunk of streaming data from the streaming server and transmitting the initial chunk of streaming data to the UE via the RAN. The initial chunk of streaming data is received from the streaming server and transmitted to the UE while setting up the multiple streams. In this respect, the startup delay may be eliminated or reduced by passing through an initial stream, or chunk, of data received from the streaming server while additional data streams from the streaming server are established.

According to an embodiment of the invention, the method further comprises determining a number of multiple streams based on a measured bitrate to the UE and/or an air interface technology used by the RAN for transmitting the streaming data to the UE. For instance, the number of parallel streams may be selected so as to provide a desired utilization of an available communication bitrate of a radio link between the RAN and the UE.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Although some embodiments are disclosed in the context of a WCDMA 3GPP third generation communication radio access interface between a radio access node of a RAN and a UE, the invention is not limited thereto. Instead embodiments of the invention may also be embodied in other types of RANs, UEs, and communication systems through which data can be streamed, including LTE, Wireless Local Area Networks (WLANs), and other communication technologies.

The presented embodiments arise from the realization that a data stream from a streaming server can be "de-paced" to remove, or mitigate, at least some effects of pacing that are imposed by the streaming server, and thereby improve various state downswitching opportunities to conserve resources of a RAN that communicates the streaming data through a wireless radio-frequency interface to a UE, and/or to conserve resources of the UE, in particular battery lifetime.

Figure 2:
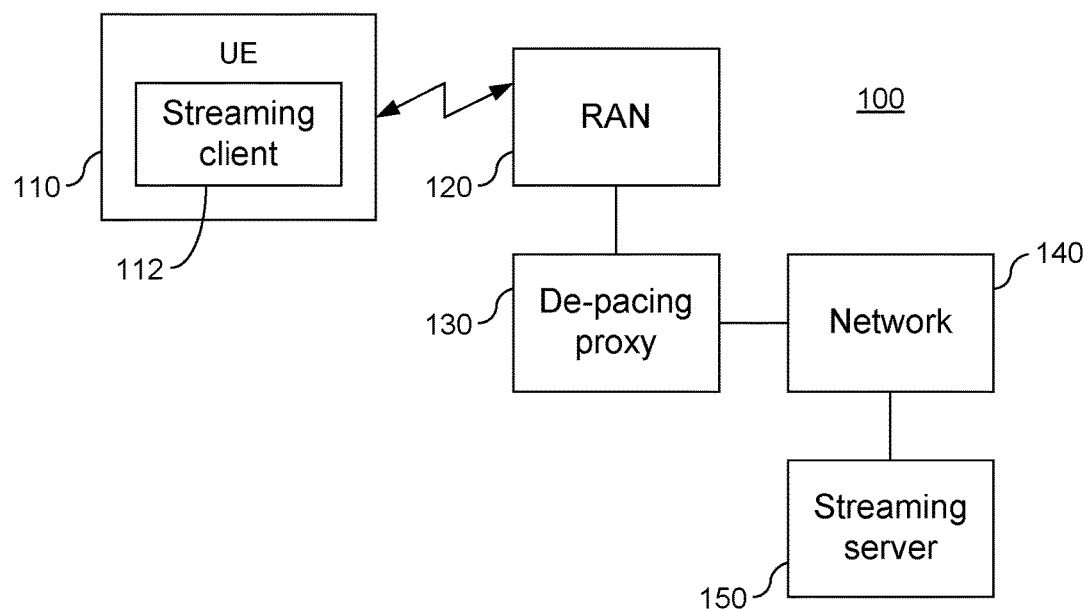
FIG. 2 illustrates a communications system for controlling streaming of data from a streaming server to a streaming client of a UE via a RAN, in accordance with an embodiment of the invention.

FIG. 2 is a block diagram of a communications system 100 for controlling streaming of data from a streaming server 150 to a streaming client 112 of a UE 110. With reference to FIG. 2, the streaming server 150 streams data through a network 140, a de-pacing proxy unit 130, and a RAN 120, to the streaming client 112. The streaming client 112 may, e.g., be a video player, an audio player, a moving navigation map, a game, or any other application receiving streamed data, on the UE 110. The data stream may contain, but is not limited to, video, audio, multimedia, application data (e.g., data for a moving navigation map applications, gaming applications, etc), and/or instructions that are executable by a processor circuit of the UE 110.

The RAN 120 may contain one or more cellular radio access technology systems that may include, but are not limited to, WCDMA, UMTS, and/or LTE. The RAN 120 may alternatively or additionally communicate with the UE 110 through a WLAN (i.e., IEEE 802.11) interface and/or another wireless technology interface.

The UE 110 may include any device that can communicate through a wireless interface with the RAN 120, and may include, but is not limited to, a mobile telephone (cellular telephone), a wireless terminal, a mobile station, a laptop/portable computer, a tablet computer, a desktop computer, an electronic book reader, and/or a game console. Additionally, the UE 110 described herein may include a device that is limited in its two-way communication capabilities or that otherwise lacks some of the capabilities of the example UE 110. For example, the described UE 110 may be capable of receiving a data stream from the streaming server 150, but may not be capable of transmitting certain types of information (e.g., stream requests, acknowledgements) to the RAN 120. Furthermore, the UE may include not only mobile devices, but also devices that are fixed, installed in a particular location, or otherwise limited in their movement.

The de-pacing proxy unit 130 is configured to re-shape a data stream that is being received from the streaming server 150 into an output data stream that has a packet, or bitrate, distribution over time, i.e., which is a sequence of bursts, and which can be optimized for the communication interface from the RAN 120 to the UE 110 and to enable the RAN 120 and/or the UE 110 to conserve resources while handling the data stream. The data stream that is output from the de-pacing proxy unit 130 may be bursty data sent to the UE 110 which increases, or maximizes, utilization of the available communication bitrate provided by the radio interface from the RAN 120 to the UE 110, thereby creating state down-switching opportunities to conserve resources of the RAN 120 and/or the UE 110.

The streaming server 150 may stream data to the streaming client 112 in a number of different ways. For example, when the data is output from the streaming server 150 towards the streaming client 112 at a bitrate which is much higher than the inherent media bitrate needed for use of the information carried by the data stream (e.g., video, audio, etc) being streamed (i.e., factor x>>1), the de-pacing proxy unit 130 can respond thereto by allowing the streaming data to pass through unaltered to the streaming client 112, which may still allow the UE 110 to discontinue downloading of the data stream at regular, or repeated, intervals and so that a transceiver of the UE 110 can be transitioned to a lower radio state, e.g., sleep state and/or lower bitrate state.

The de-pacing proxy unit 130 can be configured to determine the inherent bitrate required for a data stream, e.g., based on information provided during setup of a streaming session and/or based on information carried by the data stream. The de-pacing proxy unit 130 can further determine when the present bitrate of the data stream from the streaming server 150 exceeds the inherent bitrate by at least a threshold amount, and respond to such excess streaming bitrate by allowing the streaming data from the streaming server 150 to pass through unaltered, i.e., without de-pacing, to the streaming client 112. The RAN 120 can transmit sequential bursts of the streaming data to the transceiver of the UE 110, which enables the transceiver of the UE 110 to be transitioned to a lower radio state, e.g., a sleep state and/or lower bitrate state, in-between receiving the bursts of streaming data.

In contrast, when the de-pacing proxy unit 130 determines that the data stream from the streaming server 150 exceeds the inherent bitrate by less than the threshold amount, i.e., factor x>1, the de-pacing proxy unit 130 may operate according to one of the following embodiments to provide an increased stream bitrate through the radio interface to the UE 110 by way of increasing the burstiness of the data transmissions.

The de-pacing proxy unit 130 may accumulate a threshold amount of data from the streaming server 150 into a buffer before forwarding a chunk of the data to the RAN 120 at a higher bitrate than it was received from the streaming server 150. This approach introduces a startup delay in providing an initial chunk of the data to the steaming client 112, because the initial chunk of data is accumulated by the de-pacing proxy unit 130 before being forwarded. The duration of the startup delay will depend upon the available radio interface bitrate between the RAN 120 and the UE 110 and the bitrate from the streaming server 150. By adjusting how much data is accumulated before the first chunk is delivered downstream to the streaming client 112, the potential increase in radio efficiency can be traded-off for the potential decrease in duration of the startup delay and vice versa.

Figure 3:
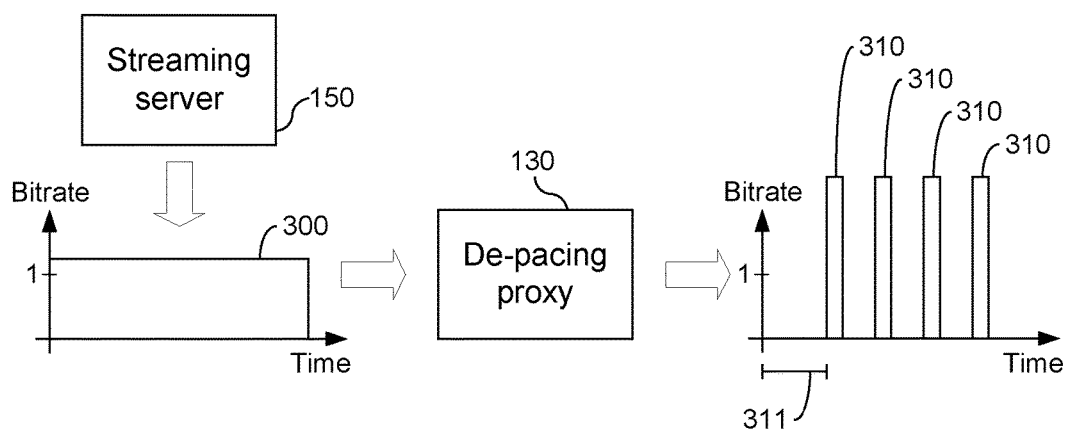
FIG. 3 illustrates streaming of data from a streaming server to a UE via a RAN using a de-pacing proxy unit, in accordance with an embodiment of the invention.

FIG. 3 illustrates a situation where the streaming server 150 is streaming data at a bitrate factor x which is a little greater than 1. The de-pacing proxy unit 130 performs de-pacing operations on the data stream 300 received from the streaming server 150 to accumulate chunks of data that are then communicated in data bursts 310 to the RAN 120 at a higher bitrate factor x to cause bursty data transmission to the streaming client 112. It is noted that, in FIG. 3, the bitrate factor x of the data bursts 310 is much greater than 1. It is further noted that this approach introduces a playout delay 311 as the initial chunk of data is accumulated before being forwarded to the RAN 120.

Figure 4:
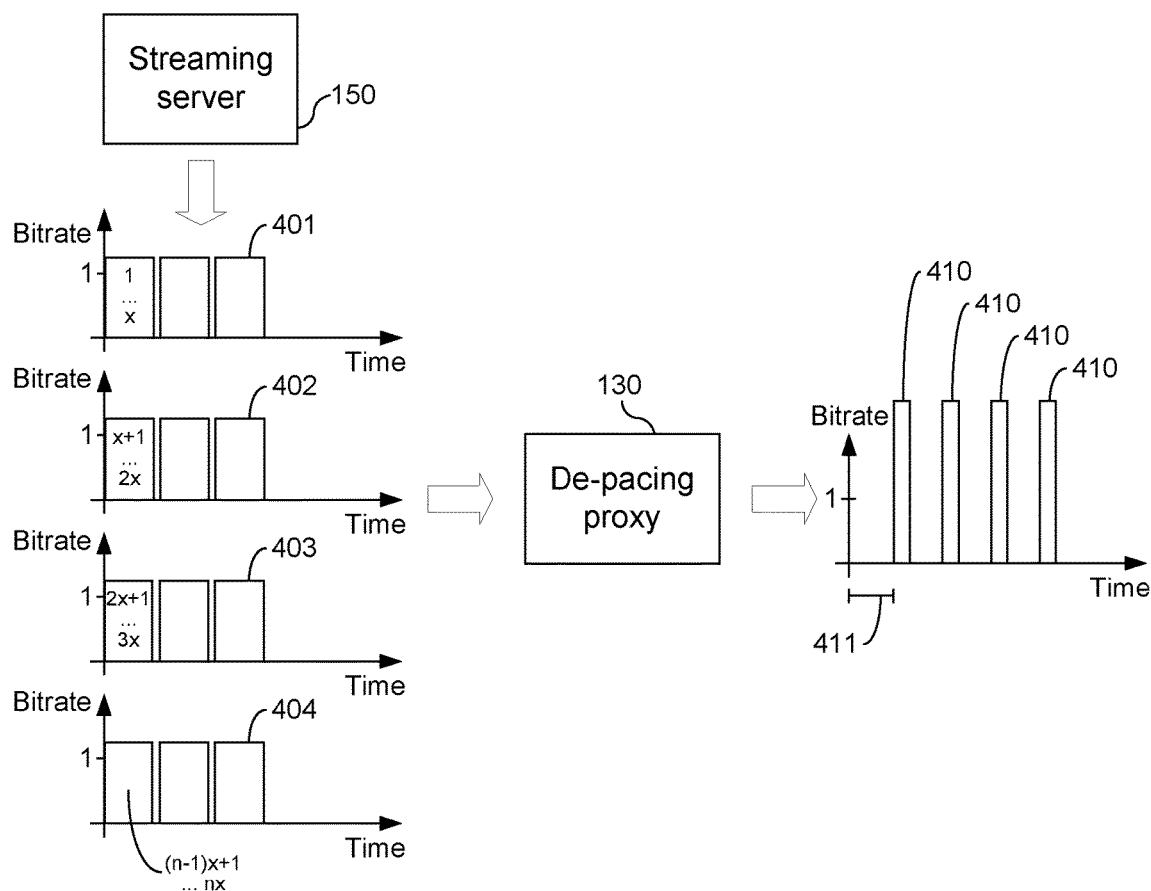
FIG. 4 illustrates streaming of data from a streaming server to a UE via a RAN using a de-pacing proxy unit, in accordance with another embodiment of the invention.

Further, with reference to FIG. 4, which illustrates streaming of data in accordance with another embodiment of the invention, the de-pacing proxy unit 130 can setup multiple streams 411-414, e.g., 2, 3, 4, . . . n, streams, from the streaming server 150 towards the streaming client 112, where the data byte start values of the multiple streams are offset with respect to each other to enable the multiple streams to be received in parallel by the de-pacing proxy unit 130. The de-pacing proxy unit 130 can then combine the data received in the parallel streams to output higher-bitrate bursts 410 to the RAN 120 for communication to the streaming client 112 of the UE 110. Using multiple streams in this manner allows the de-pacing proxy unit 130 to accumulate threshold amounts of the data more quickly and thereby reduce the startup delay 411 as compared to the startup delay 311 for a single stream, and/or increase the burstiness of the data transmitted by the RAN 120 to the UE 110.

The startup delay 411 may be reduced by a factor of the number of streams used while the radio efficiency factor is kept equal. It is noted that this approach may be particular beneficial when the relatively low data streaming bitrate from the streaming server 150 is caused by constraints imposed by an internal policy provided by the streaming server 150, e.g., pacing the data stream so that the streaming client 112 would have just enough data for operation, rather than due downstream data transport limitations. The startup delay may be eliminated or reduced by the de-pacing proxy unit 130 passing through an initial stream, or chunk, of data while it requests setup of a plurality of additional data streams from the streaming server 150.

Figure 5:
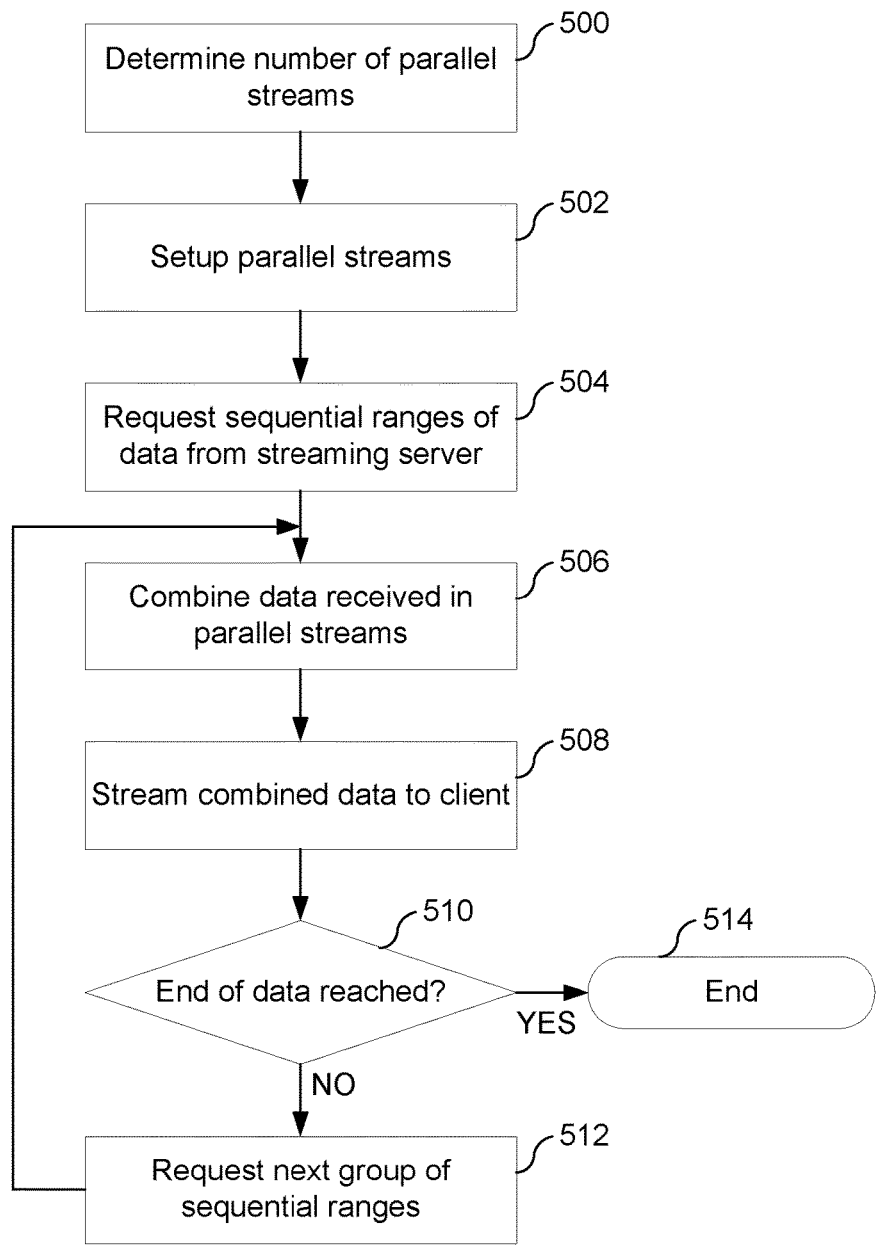
FIG. 5 illustrates a method of controlling streaming of data from a streaming server to a UE via a RAN, in accordance with an embodiment of the invention.

In FIG. 5, an embodiment of the method according to the first aspect of the invention is illustrated. Embodiments of the method may be performed by the de-pacing proxy unit 130 of FIG. 2.

Referring to FIGS. 4 and 5, the de-pacing proxy unit 130 responds to, e.g., a command to stream data from a file on the streaming server 150, by determining 500 a number of parallel streams that are to be setup between the streaming server 150 and the de-pacing proxy unit 130. The number of parallel streams may be determined based on a presently measured bitrate from the de-pacing proxy unit 130 to the UE 110. For example, the de-pacing proxy unit 130 may measure the bitrate by setting up a first stream of data to the UE 110 and measuring the average, maximum, or another metric measured from the first stream, and/or by measuring the bitrate of another existing data stream that is being provided to the UE 110 and/or to another UE which may be assumed to utilize a similar air interface technology or be subjected to similar communication bitrate constraints as the UE 110.

Alternatively or additionally, the number of parallel streams may be determined 500 based on a wireless air interface technology that will be used for communication of the data stream from the RAN 120 the UE 110. The de-pacing proxy unit 130 may communicate with the RAN 120 or another network node to determine what wireless air interface technology will be used to communicate the data stream, and estimate the available bitrate based on that determination.

The number of parallel streams can be selected to provide a desired utilization of the available bitrate to the UE 110. For example, the number of parallel streams may be selected to provide a defined level of utilization, e.g., maximum utilization or some other defined level, of the available bitrate to the UE 110 so that the UE 110 can transition to a lower communication state, e.g., a sleep state or a lower bitrate state, in-between receiving further chunks of data from the de-pacing proxy unit 130.

The de-pacing proxy unit 130 then performs operations to setup 502 the determined number of parallel streams between the streaming server 150 and the de-pacing proxy unit 130, such as by performing the determined number of HyperText Transfer Protocol (HTTP) requests for defined sequential data address ranges.

In the example of FIG. 4, the de-pacing proxy unit 130 has selected "n" streams. Accordingly, the de-pacing proxy unit 130 requests 504, e.g., by using HTTP requests, sequential ranges of data from the stream server 150. As shown in FIG. 4, the de-pacing proxy unit 130 requests a byte range from 1 to x to be streamed through a first stream 401, a byte range from x+1 to 2x to be streamed through a second stream 402, a byte range from 2x+1 to 3x to be streamed through a third stream 403, and so on, requesting further byte ranges with an n'th request for a byte range from (n−1)x+1 to nx to be streamed through an n'th stream 404 (where "n" is a positive integer).

The de-pacing proxy unit 130 combines 506 the data received through the parallel streams 401-404 to generate contiguous block of the data. The de-pacing proxy unit 130 then streams 508 the combined block of data downstream toward the streaming client 112.

The data that is received through the parallel streams 401-404 can be buffered in a buffer memory of the de-pacing proxy unit 130 until a threshold amount of data is received and/or until a defined time has elapsed since a previous cycle of operations to combine the received data, and then the de-pacing proxy unit 130 can initiate operations for combining 506 the received data to generate a combined block of data for output downstream toward the streaming client 112.

Although generation of contiguous blocks of data is preferable or necessary for use by some types of streaming clients 112, for some other types of streaming clients 112 it may be allowable to have some gaps in the data (e.g., resulting in loss of one or less than a defined number of frames of video or loss of a short burst of audio may be unnoticed or by a user or otherwise acceptable). Accordingly, the de-pacing proxy unit 130 may generate substantially contiguous blocks of data when data from one of the streams is missing at a time when the combined data needs to be output downstream toward the streaming client 112.

The de-pacing proxy unit 130 determines 510 whether all data has been received from the streaming server 150, e.g., by determining whether the end of a video has been reached, and, when not all data has been received, the de-pacing proxy unit 130 requests 512 of a next incremental group of sequential memory ranges of data from the streaming server. According to the example of FIG. 4, the de-pacing proxy unit 130 generates another n requests for byte ranges that incrementally follow the last data byte requested by the n'th request of the previous cycle of requests.

In this manner, the de-pacing proxy unit 130 initiates a defined number of parallel streams of data to be output by the streaming server 150, and combines data from the parallel streams to output combined data 410 at a higher bitrate toward the streaming client 112. The RAN 120 can thereby transmit data at a higher bitrate than would otherwise be possible if a single stream of data were received from the streaming server 150 while the streaming server 150 is pacing (constraining) the bitrate of the single steam below the higher available bitrate from the RAN 120 to the transceiver of the UE 110.

The de-pacing proxy unit 130 therefore operates to remove at least some effects of pacing that are imposed by the streaming server 150, and thereby creates various state downswitching opportunities for transitioning the UE 110, or transceiver therein, to a lower communication state, e.g., sleep state or lower bitrate communication state, to conserve resources of the UE 110 and/or conserve resources of the RAN 120.

Figure 1:
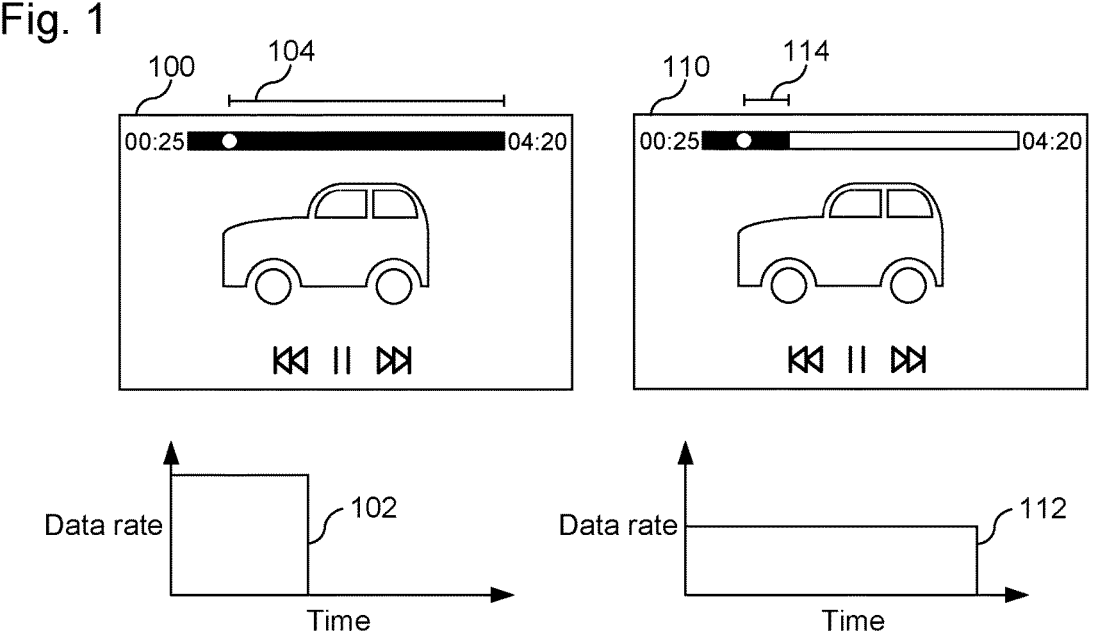
FIG. 1 illustrates information that is displayable on a display device of a UE while a video stream is being played, both with and without controlled pacing of the video stream.
Figure 6:
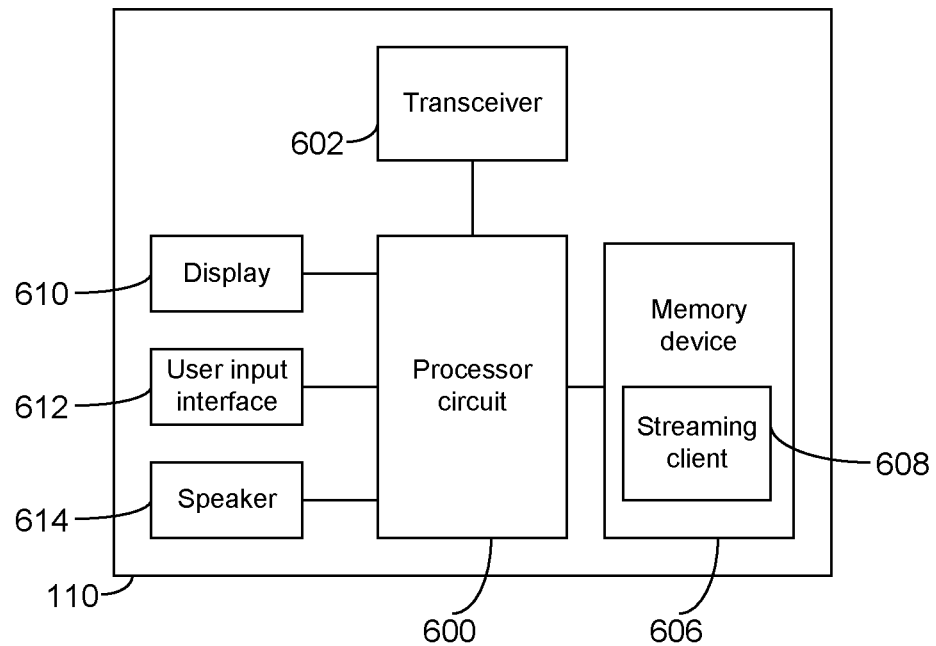
FIG. 6 shows a block diagram of a UE, in accordance with an embodiment of the invention.

FIG. 6 shows a block diagram of the UE 110 of the communications system 100 of FIG. 1, in accordance with an embodiment of the invention. The UE 110 includes a transceiver 602, a processor circuit 600, and a memory device 606 containing a streaming client 608, e.g., a video player, an audio player, a game, or any other application, and may contain other functional modules. The UE 110 may further include other elements, such as a display 610, a user input interface 612, and a loudspeaker 614.

The transceiver 602, e.g., WCDMA, LTE, or other RF communication transceiver, is configured to communicate with the RAN 120 of the system 100 over a RF wireless communication interface. The processor circuit 600 may include one or more data processing circuits, such as a general purpose and/or special purpose processor, e.g., microprocessor and/or digital signal processor. The processor circuit 600 is configured to execute computer program instructions from the memory device 606, described below as a computer readable medium, to perform at least some of the operations and methods described herein as being performed by a UE in accordance with one or more embodiments of the present invention. The RAN 120 may include similar elements to the UE 110, although likely absent the display 610, the user interface 612, and the loudspeaker 614.

Figure 7:
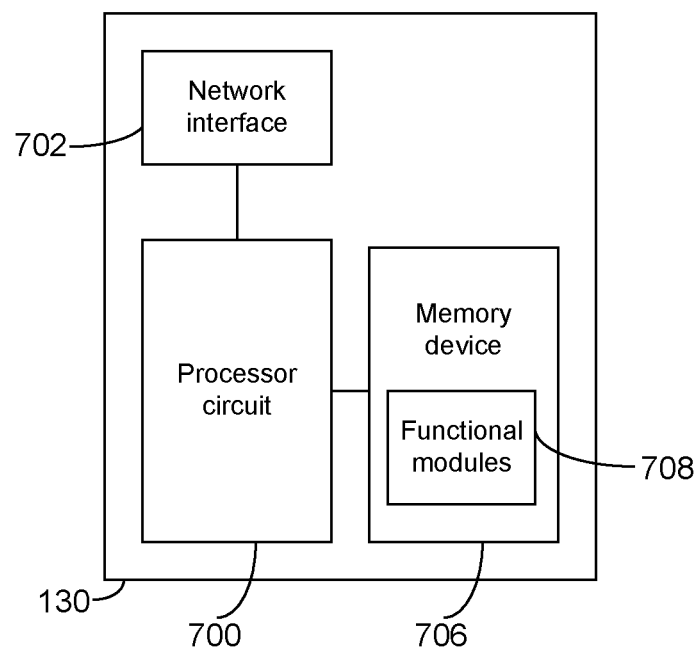
FIG. 7 shows a block diagram of a de-pacing proxy unit, in accordance with an embodiment of the invention.

FIG. 7 is a block diagram of a de-pacing proxy unit 130, in accordance with an embodiment of the invention, and which may be included as part of the streaming server 150 and/or the RAN 120, or which may be a separate network node or other element of the communications system 100 shown in FIG. 1. The de-pacing proxy unit 130 can comprise a network interface 702, a processor circuit 700, and a memory device 706 containing functional modules 708. The network interface 702 can optionally be included in the de-pacing proxy unit 130 and configured to provide network communications to the streaming server 150 and/or the RAN 120, depending upon where the de-pacing proxy unit 130 is located and how it is configured to communicate to perform at least some of the associated functionality disclosed herein.

The processor circuit 700 may include one or more data processing circuits, such as a general purpose and/or special purpose processor, e.g., microprocessor and/or digital signal processor. The processor circuit 700 is configured to execute computer program instructions from the functional modules 708 of the memory device 706, described below as a computer readable medium, to perform at least some of the operations and methods described herein as being performed by the de-pacing proxy unit 130 in accordance with one or more embodiments of the present invention.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium such as an electronic, magnetic, optical, electromagnetic, or semiconductor data storage system, apparatus, or device.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

The person skilled in the art realizes that the invention by no means is limited to the embodiments described above. On the contrary, many modifications and variations are possible within the scope of the appended claims.

The invention claimed is:

1. A method of controlling streaming of data from a streaming server to a User Equipment, UE, via a Radio Access Network, RAN, the method comprising:
   requesting, by the RAN, multiple streams of data from the streaming server for sending to the UE, wherein data byte start values of the multiple streams are offset and the multiple streams have sequential ranges of data,
   receiving, by the RAN, the multiple streams of data from the streaming server,
   combining the multiple streams of data received from the streaming server into a combined stream of data,
   re-shaping the combined stream of data into bursts, and
   transmitting the bursts to the UE at a higher bitrate than respective bitrates of each stream of the multiple streams of data that were received from the streaming server.

2. The method according to claim 1, wherein the transmitting the bursts to the UE comprises transmitting the bursts at a bitrate adjusted to increase utilization of an available communication bitrate provided by the RAN.

3. The method according to claim 1, wherein the combining the multiple streams of data comprises combining the multiple streams of data into contiguous blocks of streaming data.

4. The method according to claim 1, further comprising:
   accumulating, by the RAN, an initial chunk of data from one or more of the multiple streams of data from the streaming server, and
   transmitting the initial chunk of data to the UE by the RAN while setting up the multiple streams.

5. The method according to claim 1, further comprising:
   determining a number of the multiple streams based on a measured bitrate to the UE and/or an air interface technology used by the RAN for transmitting the bursts to the UE.

6. A computer program product comprising a non-transitory computer readable medium storing computer program instructions, the computer program instructions when executed on a processor causes the processor to perform the operations comprising the method according to claim 1.

7. A proxy unit for controlling streaming of data from a streaming server to a User Equipment, UE, via a Radio Access Network, RAN, the proxy unit comprising:
   a processor and
   a memory comprising instructions executed by the processor to cause the processor to perform operations comprising:
   requesting, by the RAN, multiple streams of data from the streaming server for sending to the UE, wherein data byte start values of the multiple streams are offset and the multiple streams have sequential ranges of data,
   receiving, by the RAN, the multiple streams of data from the streaming server,
   combining the multiple streams of data received from the streaming server into a combined stream of data,
   re-shaping the combined stream of data into bursts, and
   transmitting the bursts to the UE at a higher bitrate than respective bitrates of each stream of the multiple streams of data that were received from the streaming server.

8. The proxy unit according to claim 7, wherein the transmitting the bursts to the UE comprises transmitting bursts at a bitrate being adjusted so as to increase utilization of an available communication bitrate provided by the RAN.

9. The proxy unit according to claim 7, being wherein the combining the multiple streams of data comprises combining the multiple streams of data into contiguous blocks of streaming data.

10. The proxy unit according to claim 7, wherein the processor is further configured to perform operations comprising:
    accumulating, by the RAN, an initial chunk of data from one or more of the multiple streams of data from the streaming server, and
    transmitting the initial chunk of data to the UE by the RAN while setting up the multiple streams.

11. The proxy unit according to claim 7, wherein the processor is further configured to perform operations comprising:
    determining a number of the multiple streams based on a measured bitrate to the UE and/or an air interface technology used by the RAN for transmitting the bursts to the UE.

12. The method according to claim 1, wherein the multiple streams of data are received from the streaming server simultaneously.

13. The proxy unit according to claim 7, wherein the multiple streams of data are received from the streaming server simultaneously.

* * * * *